Dec. 23, 1947.  J. W. GREENBOWE ET AL  2,433,116
MANUFACTURE OF GLASSWARE
Filed April 28, 1942   3 Sheets-Sheet 2
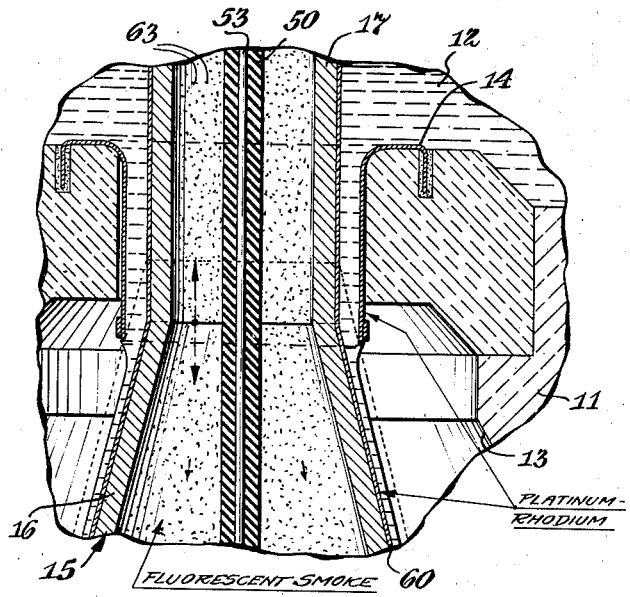
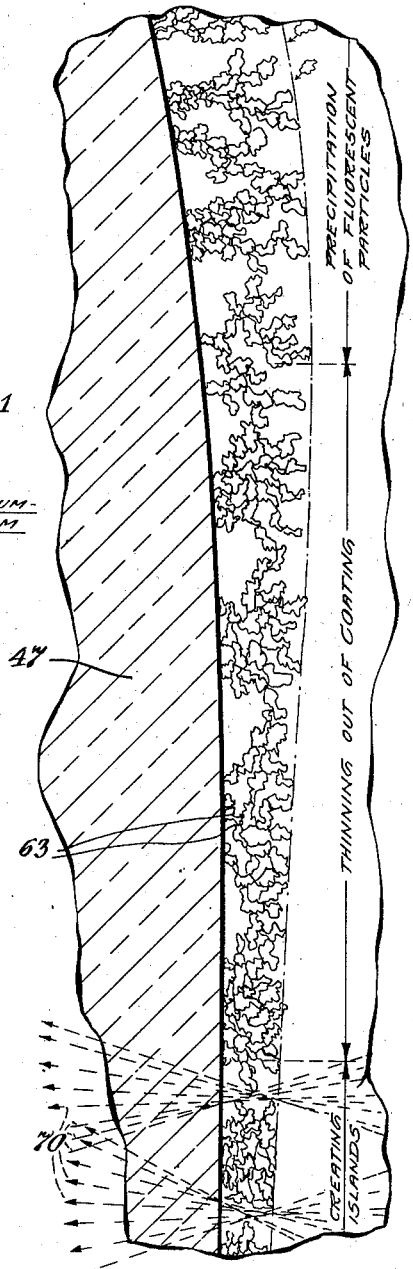
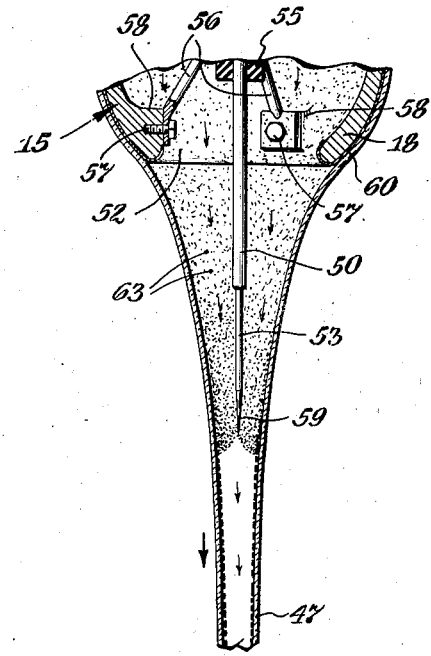
INVENTORS
J. W. GREENBOWE
A. H. LAIDIG
W. F. KELLY, JR.
BY
ATTORNEY

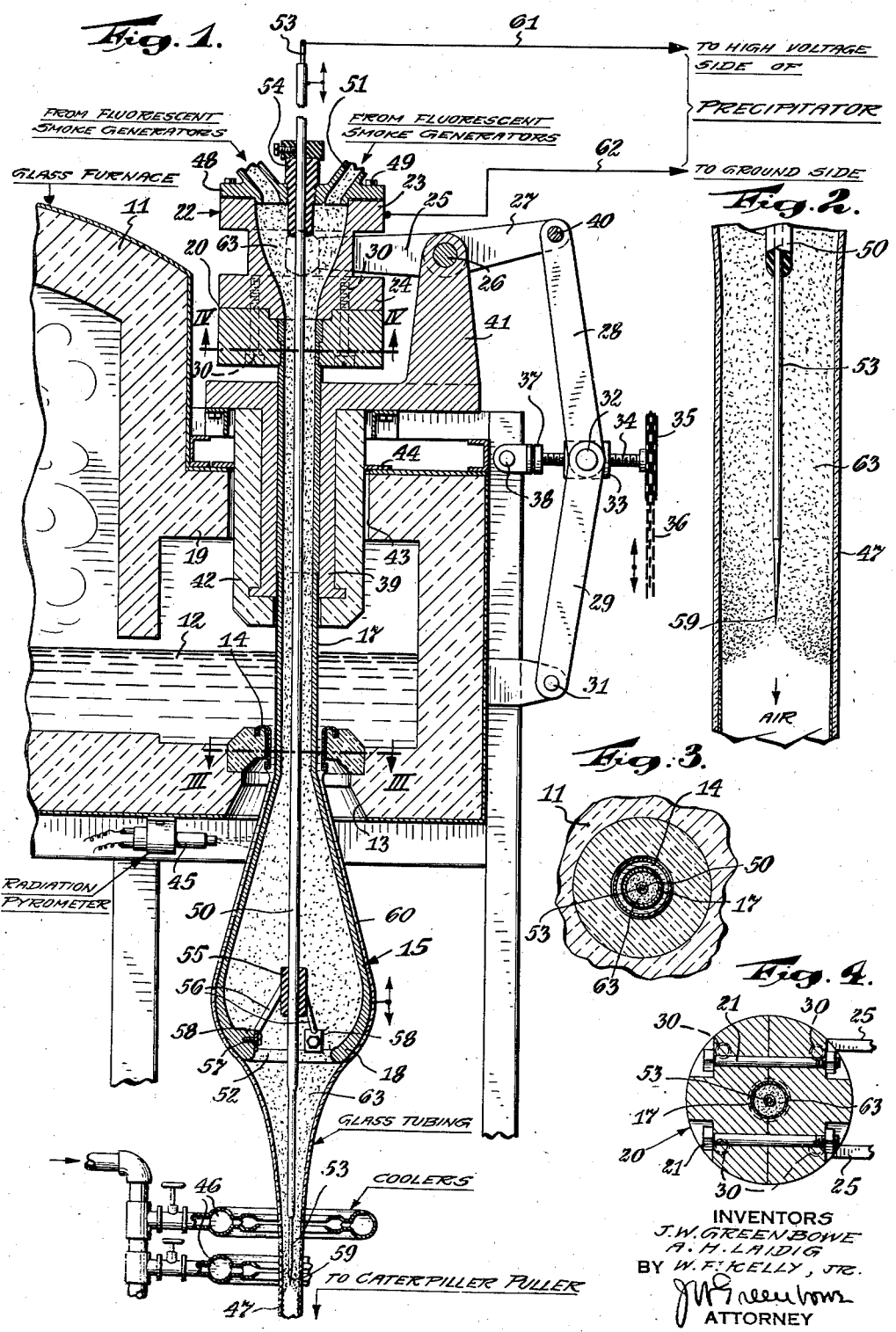

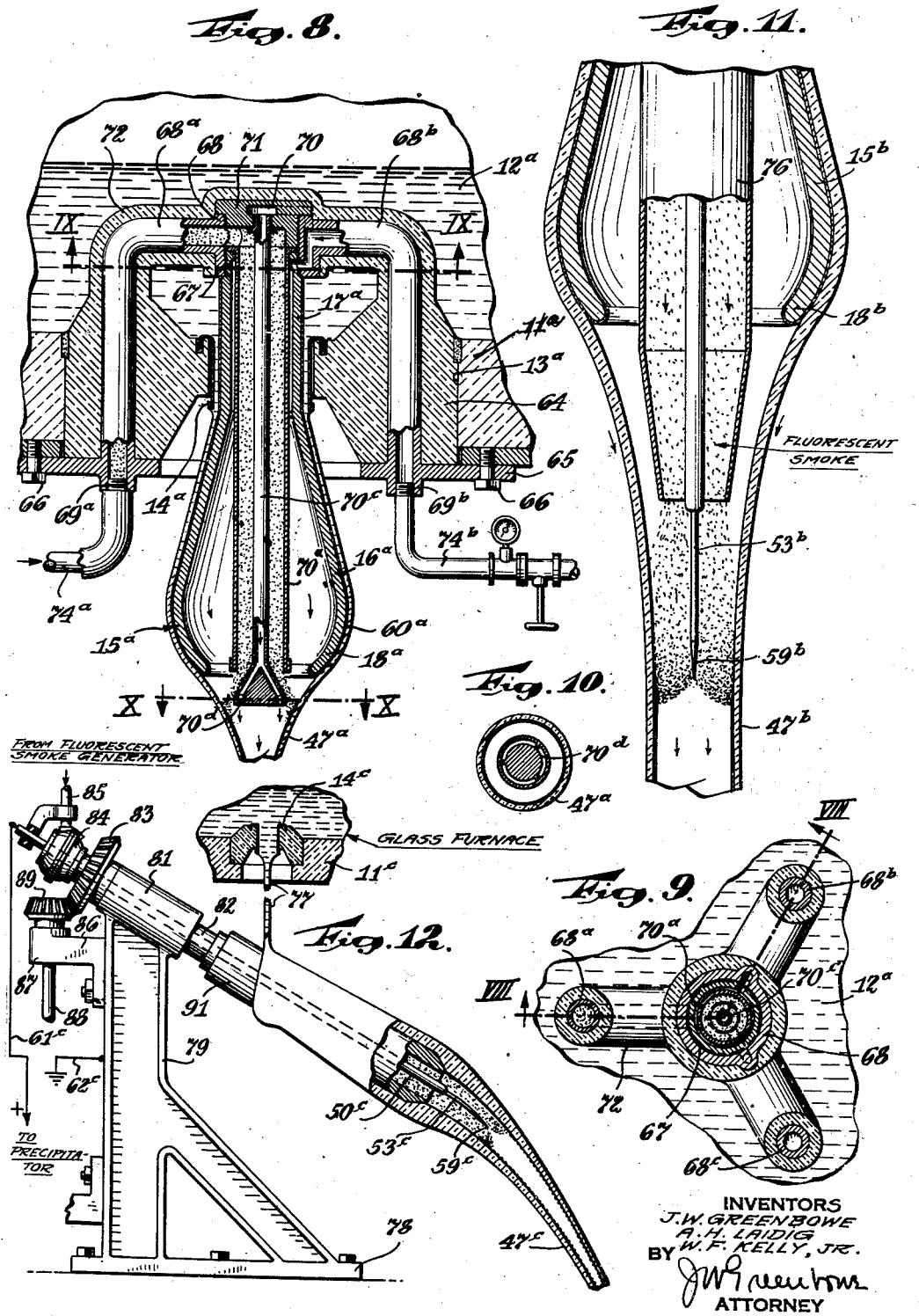

Patented Dec. 23, 1947

2,433,116

UNITED STATES PATENT OFFICE 2,433,116

MANUFACTURE OF GLASSWARE

James W. Greenbowe, East Orange, Alfred H. Laidig, Bloomfield, and William F. Kelly, Jr., West Caldwell, N. J., assignors to Westinghouse Electric Corporation, East Pittsburgh, Pa., a corporation of Pennsylvania Application April 28, 1942, Serial No. 440,792

5 Claims. (Cl. 49—1)

This invention relates to the manufacture and coating of vitreous material and, more particularly, to a method and apparatus for manufacturing glassware and applying fluorescent coating to glass tubing during the process of manufacture, and the coated tubing itself.

The principal object of our invention, generally considered, is to draw glass tubing from a mandrel portion, on which very fluid glass is deposited from a furnace, and apply fluorescent material to the inner surface of said tubing as it is being drawn, thereby adapting it for use in the manufacture of fluorescent lamps.

Another object of our invention is the electrostatic precipitation of dry fluorescent powder on the inner surface of glass tubing as it is being drawn, in order to form a desired coating thereon.

A further object of our invention is the precipitation of dry fluorescent powder upon glass tubing while soft and in the process of being drawn, and stretching said tubing after said precipitation, thereby thinning out the coating, or providing spaces between islands thereof, to provide for the more efficient generation of light thereby.

A still further object of our invention is to draw glass tubing directly from the bottom of a vertical stationary generally pear-shaped mandrel, upon the upper portion of which is deposited molten glass to be cooled to a drawing temperature during its descent along said mandrel.

Other objects and advantages of the invention, relating to the particular arrangement and construction of the various parts, will become apparent as the description proceeds.

Referring to the drawing:

Fig. 1 is a vertical sectional view of apparatus embodying our invention.

Fig. 2 is a fragmentary vertical sectional view on an enlarged scale, of a portion of the glass tubing as it is being drawn from the mandrel shown in Fig. 1 about an associated electrode.

Fig. 3 is a horizontal sectional view on the line III—III of Fig. 1, in the direction of the arrows.

Fig. 4 is a horizontal sectional view on the line IV—IV of Fig. 1, in the direction of the arrows.

Fig. 5 is a fragmentary vertical sectional view on an enlarged scale, of a portion of the apparatus shown in Fig. 1.

Fig. 6 is a vertical sectional view on an enlarged scale, of another portion of the apparatus shown in Fig. 1, but with the electrode raised to deposit fluorescent material on a softer portion of the glass tubing.

Fig. 7 is an enlarged sectional view of a portion of the glass tubing as it is being thinned out after application of the fluorescent material thereto, in order to form islands of said material spaced by clear glass portions.

Fig. 8 is a fragmentary vertical sectional view, on the line VIII—VIII of Fig. 9 in the direction of the arrows, corresponding to Fig. 1, but showing another embodiment of our invention.

Figs. 9 and 10 are sectional views on the lines IX—IX and X—X, respectively, of Fig. 8, in the directions of the arrows.

Fig. 11 is a fragmentary vertical sectional view of apparatus involving a further embodiment of our invention.

Fig. 12 is a diagrammatic view showing portions of the apparatus involving a still further embodiment of our invention.

Referring to the drawings in detail, and first considering the embodiment of our invention illustrated in Figs. 1 to 7, inclusive, there is shown a portion of a glass furnace 11 containing molten glass 12, preferably in a very fluid condition due to high temperature, say approximating that at which fining takes place or at a temperature of about 1200° C. to 1300° C., so that it has a viscosity of about 1,000 poises. The bottom of the furnace is apertured as indicated at 13, and a die 14 is provided, desirably supported by a refractory ceramic block lining said aperture. The die 14 is preferably formed of an alloy of platinum and rhodium, such as described and claimed in the Richardson Patent No. 2,190,296, dated February 13, 1940, or equivalent material, so that its aperture will not vary appreciably when in operation for long periods of time.

Below, extending through, and axially disposed with respect to, said die 14 is a hollow non-rotating mandrel 15, desirably covered with a shell 60 of durable material such as an alloy of platinum and rhodium or equivalent material like the die 14, the intermediate portion 16 of which is desirably frusto-conical, the upper or smaller portion 17 cylindrical or tubular, and the lower terminal portion 18 of which is desirably spherical. The cylindrical portion 17 passes vertically and axially through the die 14, and is long enough to project through the upper wall 19 of the furnace 11. Its projecting upper end portion is notched and gripped between sections of a control block 20, by means of bolts 21. Said control block is, in turn, connected, as by means of screws 30, to a union 22 provided with upper and lower flanges 23 and 24, between which the free or rounded ends of control levers 25 fit, in order to adjust the vertical position of the associated mandrel 15, as for controlling the flow of the annular glass stream between the die 14 and mandrel 15 by correspondingly varying the radial width of the space between said die and mandrel.

The levers 25 are desirably pivoted, as indicated at 26, and have outer arms 27 which may be raised or lowered to a limited extent by means of toggle levers 28 and 29, the former of which is pivoted at its upper end to a rod 40 extending between the free ends of the arms 27, and the latter of which is pivoted to the furnace frame, as indicated at 31. The levers 28 and 29 are pivoted together, as indicated at 32, and controlled by movement of a pivot carrying nut 33 movable on a threaded shaft 34 having an operating wheel 35 over which passes a control chain 36. The threaded shaft 34 is journaled in a bracket 37 pivoted to the frame of the furnace, as indicated at 38. By this arrangement movement of the chain 36 to turn the wheel 35, one way or the other, raises or lowers the mandrel 15 in the die 14, as may be desired, to control the flow of glass through the annular space therebetween.

In order to protect the portion 17 of the mandrel from the hot flames and gases in the glass furnace, said mandrel is mounted to reciprocate in a relatively long bearing 39 depending from a furnace-frame-carried bracket 41, which also desirably carries the pivot 26 for the operating levers 25. The bearing 39 is, in turn, protected by ceramic refractory material 42. Any space between said material 42 and the aperture 43 in the upper wall 19 of the furnace 11, is closed by a washer 44 resting on said upper wall.

The temperature of the glass which flows down along the frusto-conical portion 16 of the mandrel 15 is desirably maintained by a radiation pyrometer 45 sighted thereon to thereby control the heat of the furnace, as by means of apparatus such as that described and claimed in the Richardson patent, No. 2,116,450, dated May 3, 1938, so that the glass is fed to said mandrel at uniform temperature and viscosity, along which it gradually cools and finally passes off the mandrel to be drawn to tubing 47 by the usual caterpillar puller after it reaches a temperature suitable for such purpose, that is for example, after it is sufficiently viscous for working, say at about 1000° C. where the viscosity is about 10,000 poises, reference being had to the article by Henry K. Richardson in the Journal of the American Ceramic Society, entitled "Flow of glass through tubular orifices" beginning on page 239 of volume 17, number 8, August 1934.

In order to provide for additional cooling, if necessary, so that when the glass tubing reaches the caterpillar puller it is of the desired hardness, one or more cooling devices 46 are provided for blowing cool air on the glass tubing 47, reference being had to the co-pending application of Laidig et al., Serial No. 431,378, filed February 18, 1942, and owned by the assignee of the present application, showing similar cooling means as well as a caterpillar puller for drawing the glass after passing from a cooling mandrel.

To apply fluorescent material to the inner surface of the glass as it is drawn from the mandrel 15, a connection is made with the upper portion of the union 22, as by means of a plate 48 connected thereto as by screws 49 and having ports 51 through which fluorescent smoke, that is air carrying fluorescent powder in suspension, is fed to the hollow mandrel 15 down the cylindrical portion 17 thereof, through the frusto-conical portion 16, and finally out of the aperture 52 in the lower end of the spherical portion 18 and to the glass tubing 47 being drawn therefrom.

Although the fluorescent smoke may be produced in any desired manner, yet we prefer to generate it as described and claimed in the Gustin et al. application, Serial No. 420,940, filed November 29, 1941, which issued as Patent No. 2,426,016, August 19, 1947 and is owned by the assignee of the present application, using one or more generators in accordance with the output required.

In the present embodiment, we prefer to assist the deposition of the fluorescent material on said glass by providing an electrostatic field between ionized portions of the smoke and the glass tubing so as to more positively induce a deposition of the material on said glass, although it may be sufficient to produce the fluorescent coating on the inner surface of the tubing being drawn by merely blowing such smoke along the tubing as it is being formed, and relying on the adhesion of the particles thereof to the inner surface of the relatively soft glass. For this purpose we provide a relatively long rod to function as an electrode 53 which extends through an insulator 54, threadably connected to the plate 48, and an insulator 55 mounted inside of the hollow mandrel 15, as by means of supporting legs 56 connected by screws 57 to bosses 58 on the spherical portion 18, so that its lower end 59, desirably pointed, projects below the mandrel 15 to where the electrostatic precipitation is desired. The rod 53 is desirably coated with an insulating sleeve 59, except adjacent its upper and lower ends.

The electrode 53 is preferably connected to the positive terminal of a source of high voltage, such as an electrostatic precipitator, as described and claimed in the Penney Patent No. 2,129,783, of September 13, 1938, as by means of line 61, while the mandrel 15 is grounded as by means of line 62. Thus when in operation with the voltage applied and the glass flowing down the side of the mandrel and being drawn into tubing therebeneath, as shown in Figs. 1, 2, 5, and 6, the particles of fluorescent material in the smoke 63 which is blown through the mandrel become ionized, positively or negatively depending on the relative potential of the electrode 53, to a potential different from the heat softened tubing 47 which is conductive by virtue of its temperature, and are attracted to and deposited on said tubing, particularly adjacent the sharp point 59 of the electrode, as shown most clearly in Fig. 2, thereby resulting in an adherence of a fluorescent coating to the inner surface of the tubing.

Although the tubing may have a substantially uniform coating or deposition of fluorescent material at the level of the point 59 of the electrode 53, especially when the electrode is relatively low, as shown in Fig. 1, so that the deposition is on substantially solidified tubing, yet by virtue of the fact that the tubing is somewhat stretched beyond this point of deposition, especially when the electrode is relatively high as in Fig. 6, the deposited coating is thinned out to some extent with the tubing, along the distance designated by "Thinning out of coating" in Fig. 7, so that it may even be separated into islands by minute distances which allow the more brilliant light from the interior surface of the fluorescent coating formed by action of ultra-violet radiations thereon to be emitted therebetween, as indicated by the lines 79, when the tubing is used as the envelope of a fluorescent lamp, thereby effecting a more efficient generation of light by means of such apparatus.

Referring now to the embodiment of our invention illustrated in Figs. 8, 9 and 10, there is shown a glass furnace 11a generally corresponding with the furnace 11 of the preceding embodiment, and containing molten glass 12a preferably in a very fluid condition, for example, between about 1200° and 1300° C. The bottom of the furnace is apertured as indicated at 13a and receives a removable refractory ceramic block 64 having a generally central aperture lined with a die 14a, preferably formed of an alloy of platinum and rhodium or its equivalent, as in the preceding embodiment. Said block and its associated die may be held in place as by means of a plate portion 65 connected to said wall by screws 66.

Below, extending through, and axially disposed with respect to said die 14a is a hollow stationary mandrel 15a with its axis normally vertical, the intermediate portion 16a of which is desirably frusto-conical, the upper or smaller portion 17a cylindrical or tubular, and the lower terminal portion 18a desirably spherical. The outer surface of said mandrel is desirably coated with a layer 60a of material such as platinum rhodium or its equivalent, like that of the die 14a, as in the preceding embodiment. The cylindrical portion 17a passes axially through the die 14a and instead of projecting through the upper wall of the furnace, is reduced in section, as indicated at 67 and connected to a threaded hub member 68. Pipes 68a, 68b and 68c radiate from said hub member 68 and then extend downward to merge with and pass through the plate 65, and communicate with interiorly threaded bosses, 69a, 69b and one similar thereto but not illustrated. The reduced section 67 threadably connects with the hub member 68. The mandrel 15a is thus supported by the pipes 68a, 68b and 68c projecting from the plate 65.

After making this connection, the upper portion of the hub member 68 is desirably closed by a threaded plug 71 ported at 70 for connecting the pipe 68c with an inner pipe 70c terminating in a generally annular nozzle 70d.

Mounted inside of the mandrel 16a is a generally cylindrical sleeve 70a which may be held in place by an annular flange at its upper end clamped between the lower face of the plug 71 and the upper end of the reduced section 67 of the mandrel.

The pipe 68a connects with this sleeve 70a, and serves through connecting pipe 74a, for delivering fluorescent smoke, if desired, to said sleeve and discharging it upon the upper generally frusto-conical surface of the nozzle 70d. The pipe 68b, as by means of connecting pipe 74b, serves to deliver air or gas, at a relatively low pressure, between the sleeve 70a and the inner surface of the mandrel 15a, for the purpose of cooling the latter and deflecting the fluorescent material downward along the glass tubing 47a being drawn from said mandrel. The pipe 68c as by means of a connecting pipe similar to pipe 74b, serves to direct air or gas at a relatively high pressure into the pipe 70c to form an annular fluid stream immediately below the fluorescent smoke issuing from the sleeve 70a to cause said smoke, if used, to impinge at a high velocity upon the inner surface of the tubing 47a being drawn, to cause adherence of fluorescent material to said inner surface. The hub, plug, and pipes, which are submerged in the molten glass 12a, are covered with refractory ceramic material 72.

In operation, molten glass flows down between the cylindrical mandrel portion 17a and the die 14a, and along the frusto conical portion of the mandrel, the temperature of said glass being desirably maintained by a radiation pyrometer (not shown) sighted thereon to thereby control the heat of the furnace, as by means of apparatus such as referred to in connection with the preceding embodiment. The glass is, therefore, fed to said mandrel at a uniform temperature and viscosity, along which it gradually cools and finally passes off the mandrel to be drawn to the tubing 47a by the usual caterpillar pullers, after it reaches a temperature suitable for such purpose, as in the preceding embodiment. Additional cooling may be provided for as referred to in said preceding embodiment.

In the present embodiment adhesion of the fluorescent material, if used, in the smoke blown through pipes 74a and 68a, down through the mandrel 15a to the tubing 47a being drawn therefrom, assisted by the flow of air or gas from pipe 68c and/or 68b, if used, is relied on for causing a deposition of the coating on said tubing. It will be understood that plain air or gas from only one or more of the pipes 68a, 68b and 68c may be employed, if uncoated glass tubing is to be manufactured. If coated tubing is manufactured alternatives involve the use of only one of the pipes 68b and 68c. The pressure of the air or gas in one or both of the pipes 68b and 68c may be raised or lowered as found desirable in operation, and the inclination of the frusto conical surface of the nozzle portion adjusted to suit conditions. The coating is desirably deposited close to the bottom of the mandrel 15a if it is to be subsequently attenuated or separated into islands by the further drawing out or thinning of the tubing as the pulling operation is continued, thereby producing coated tubing, as in the preceding embodiment, except that the deposition of fluorescent material thereon is not as positive, due to lack of an electrostatic precipitating field.

In the embodiment of our invention illustrated in Fig. 11 a portion of an embodiment is shown which may be identical with that of Figs. 1 to 7, inclusive, except that a sleeve 76 is employed inside of the mandrel 15b, corresponding with the mandrel 15 of the first embodiment, said sleeve desirably fitting tightly in the cylindrical portion of said mandrel (not shown) and serving to conduct fluorescent smoke to the tubing 47b being drawn therebeneath, at some distance below the lower or spherical end 18b of said mandrel, but desirably somewhat above the lower or pointed end 59b of the electrode 53b. This results in the deposition of the fluorescent material along the tubing between the lower end of said sleeve and the lower end of the electrode 53b, rather than between the bottom of the mandrel and the lower end of the electrode. Except for this distinction, the construction and operation may be identical with that of the first embodiment.

Referring now to the embodiment of our invention illustrated in Fig. 12, a construction is there disclosed which may be identical except as otherwise specifically illustrated and described, with that illustrated in Fig. 1 of the Richardson et al., abandoned application, Serial No. 367,904, filed November 30, 1940, and owned by the assignee of the present application. In accordance with this embodiment the reference character 11c represents the forehearth of a glass melting furnace, using a platinum rhodium die 14c or the equivalent, such as described and claimed in the Richardson patent, No. 2,190,296, previously referred to, for providing the orifice for the glass stream.

As in the previous embodiment, the glass in said furnace is desirably maintained at or near its fining temperature, which for ordinary lime glass is in the vicinity of 1200° C. to 1300° C. The temperature of the glass stream 77 flowing from said orifice 14c is desirably controlled as by means of a radiation pyrometer (not shown) and associated apparatus, such as described and claimed in the Richardson et al. patent, No. 2,116,450, previously referred to.

Beneath the forehearth is glass working apparatus consisting of a base 78 carrying a standard 79, at the upper end of which is disposed an inclined bearing 81, in which a hollow shaft 82 is rotatably mounted. Shaft 82 is provided at its upper end with a bevel gear 83 and a suitable coupling 84 to which an air supply pipe 85 is connected. Carried on a bracket 86 is a bearing 87 for a drive shaft 88, to the upper end of which is connected a pinion 89 meshing with the gear 83, by means of which the shaft 82 is driven.

Carried on the hollow shaft 82, and covering a considerable portion of its length, is a refractory member 91 desirably cylindrical or frusto-conical in shape and forming a mandrel for receiving the molten glass issuing as a stream 77 from the furnace 11c. The cylinder 91 may also be provided with a surface of platinum rhodium alloy or its equivalent, if desired.

Extending through the pipe 82 and mandrel 91 is an electrode 53c, partly covered with insulating material 50c, and otherwise constructed like the electrode 53 in the first embodiment, except that the lower uninsulated end thereof, pointed as indicated at 59c, may be curved slightly downward, as shown, to correspond with the curvature of the tubing 47c being formed. The upper end of the electrode projects beyond the coupling 85 and is preferably connected, as by line 61c, to the positive terminal of a source of high voltage, such as an electrostatic precipitator, as described and claimed in the Penney patent, No. 2,129,783, previously referred to, while the standard 79 is grounded by line 62c.

The pipe 85 is connected to a source of compressed air carrying fluorescent powder in suspension, forming fluorescent smoke, such as generated in accordance with the Gustin et al. application, Serial No. 420,940, previously referred to.

When in operation glass flows as a stream 77 upon the mandrel 91, while being rotated by the means previously described, desirably engaging it while at a temperature of about 1080° C. to 1160° C., if lime glass, or about 1050° C. to 1125° C., if lead glass. Due to the low viscosity of the glass at such temperatures it becomes necessary to increase its viscosity before drawing, which is accomplished by the mandrel 91 which is cooled, not only by radiation but by the air carrying the fluorescent material or smoke through the same and into the tubing 47c being drawn, and upon which the fluorescent material is deposited electrostatically by means of the electrode 53c, as in the first embodiment.

A temperature drop in the glass along the mandrel may be from 210° C. to 275° C. for lime glass and from about 200° C. to 260° C. for lead glass, so that it desirably leaves the mandrel at between about 880° C. to 900° C. for lime glass or between about 840° C. to 850° C. for lead glass, that is, at temperatures possibly somewhat lower than that in the first embodiment, because the glass passes off diagonally, rather than vertically, with no special air cooling means, at which temperatures there are viscosity conditions in the glass suitable for drawing into tubing.

From the foregoing, it will be seen that we have disclosed a method and apparatus for conveniently manufacturing tubing coated with fluorescent material, said material being deposited either electrostatically or by impact of the particles on the heat softened glass surface. The glass is cooled from approximately its fining temperature to a working temperature by passing in an accurately controlled stream from the furnace and then either vertically along a stationary mandrel or diagonally along a rotating mandrel. The initial deposit of the fluorescent material is preferably, in all cases, attenuated or thinned out, with the possible formation of slightly separated islands, whereby light generated by said material is more efficiently transmitted to the exterior of the envelope.

Although preferred embodiments of our invention have been disclosed, it will be understood that modifications may be made within the scope and spirit of the appended claims.

We claim:

1. The method of manufacturing glassware comprising flowing glass, through a die in the bottom of a furnace, while in a viscosity condition at or near that at which fining thereof takes place, down along a non-rotating frusto-conical mandrel, the upper portion of which projects through said die, with an annular space therebetween, controlling the flow by vertical adjustment of said mandrel to vary the area of said space, cooling the glass as it passes along said mandrel to that viscosity at which such glass is ordinarily worked, drawing the glass from the lower end of said mandrel into a tube, suspending finely divided fluorescent powder in a gaseous medium to form a smoke, passing said smoke through said mandrel and into the tube being formed, positioning an electrode so that it projects from the lower end of said mandrel into the tube being formed, and impressing a high-voltage between said electrode and said tube to cause ionization of said smoke and effect precipitation of the suspended fluorescent material onto the inner surface of the latter.

2. Apparatus for manufacturing glassware comprising a hollow mandrel with a frusto-conical portion disposed with its axis vertical and its small end uppermost, the upper end of said mandrel merging into a cylindrical stem, and the lower end merging into a spherical terminal portion, a glass furnace, a die in the lower wall thereof, said mandrel being mounted in said furnace so that its cylindrical portion extends through said die and projects above the upper portion of the furnace, means engaging the upper cylindrical portion of said mandrel for adjusting it vertically to control the flow of glass in the annular space between said die and mandrel, an electrode positioned coaxially in said mandrel, with its lower end projecting therebelow, and its upper end projecting above the mandrel control, means for applying high voltage to said electrode and for grounding said mandrel, and a connection with the upper portion of said mandrel for blowing fluorescent smoke therethrough, whereby in operation glass flows down along said mandrel and is drawn from the lower end of the spherical portion about the electrode depending therebelow, and fluorescent material from said smoke is precipitated on the interior surface of glassware drawn from said mandrel by virtue of ionization between said electrode and the conductive hot glass flowing from the grounded mandrel.

3. Apparatus for manufacturing glassware comprising a glass furnace, a die in a lower wall thereof, a mandrel mounted in said furnace, extending axially through said die, and disposed with its axis vertical, said mandrel having a frusto-conical portion disposed below said die and with its small end uppermost, means for vertically adjusting the position of the small end of said frusto-conical portion with respect to said die to vary the area of the annular space between said small end and die in the plane of the lower end of said die and thereby control the flow of said glass between said upper frusto-conical portion and the adjacent surface of said die, whereby when in operation glass flows down along said mandrel and is withdrawn from the lower end thereof after being cooled to a desired extent, and means for blowing air through said mandrel to cool it and fill out glassware to be drawn therefrom.

4. Apparatus for manufacturing glassware comprising a glass furnace, a die in a lower wall thereof, a mandrel mounted in said furnace, extending axially through said die and disposed with its axis vertical, said mandrel having a frusto-conical portion disposed below said die and with its small end uppermost, means for vertically adjusting the position of the small end of said frusto-conical portion with respect to said die to vary the area of the annular space between said small end and die in the plane of the lower end of said die and thereby control the flow of said glass between said upper frusto-conical portion and the adjacent surface of said die, and means for blowing fluorescent smoke through said mandrel so that it passes into glassware being drawn therefrom, whereby when in operation, glass flows down along said mandrel, is cooled to the desired extent, and glassware drawn therefrom becomes coated with fluorescent material from said smoke, and means for drawing from the lower end of said mandrel glassware so coated.

5. Apparatus for manufacturing glassware comprising a glass furnace, a die in the lower wall thereof, a hollow mandrel mounted in said furnace so that its upper portion extends through said die, an electrode positioned in and coaxially of said mandrel, with its extreme end projecting from the lower end thereof, means for applying high voltage to said electrode, means for grounding said mandrel, and a connection with the upper portion of said mandrel for blowing fluorescent smoke therethrough, whereby when in operation glass flows down along said mandrel and about the electrode depending therebelow, and fluorescent material from said smoke is precipitated on the interior surface of glassware drawn from said mandrel, by virtue of ionization between said electrode and the conductive hot glass flowing from the mandrel.

JAMES W. GREENBOWE.
ALFRED H. LAIDIG.
WILLIAM F. KELLY, Jr.

REFERENCES CITED

The following references are of record in the file of this patent:

UNITED STATES PATENTS

| Number | Name | Date |
|---|---|---|
| 2,009,793 | Sanchez-Vello | July 30, 1935 |
| 2,181,305 | Myers | Nov. 28, 1939 |
| 2,207,174 | Jenkins | July 9, 1940 |
| 1,926,410 | Soubier | Sept. 12, 1933 |
| 1,926,905 | Le Coultre | Sept. 12, 1933 |
| 2,237,754 | Davies | Apr. 8, 1941 |
| 2,310,474 | Teichmann | Feb. 9, 1943 |
| 1,698,845 | Gustin | Jan. 15, 1929 |
| 2,094,242 | Parker | Sept. 28, 1937 |
| 2,370,618 | Danner | Mar. 6, 1945 |

FOREIGN PATENTS

| Number | Country | Date |
|---|---|---|
| 367,614 | Great Britain | Feb. 25, 1932 |
| 693,153 | France | Aug. 18, 1930 |
| 38,432 | France | Mar. 3, 1931 |
| 750,425 | France | May 29, 1933 |
| 431,408 | Great Britain | July 8, 1935 |